US012174989B1

(12) United States Patent
Vijayan et al.

(10) Patent No.: US 12,174,989 B1
(45) Date of Patent: Dec. 24, 2024

(54) SYSTEM AND METHOD FOR TRANSFORMATIVE DATA ANALYSIS AND DATA MODELING IN A DISTRIBUTED NETWORK

(71) Applicant: BANK OF AMERICA CORPORATION, Charlotte, NC (US)

(72) Inventors: Ganesan Vijayan, Tamil Nadu (IN); Himanshu Goyal, Uttar Pradesh (IN); Sanjay Negi, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/209,550

(22) Filed: Jun. 14, 2023

(51) Int. Cl.
*G06F 16/215* (2019.01)
*G06F 16/23* (2019.01)
*G06F 16/25* (2019.01)
*G06F 21/62* (2013.01)

(52) U.S. Cl.
CPC ........ *G06F 21/6227* (2013.01); *G06F 16/215* (2019.01); *G06F 16/2365* (2019.01); *G06F 16/258* (2019.01); *G06F 2221/2113* (2013.01)

(58) Field of Classification Search
CPC .............. G06F 21/6227; G06F 16/215; G06F 16/2365; G06F 16/258; G06F 2221/2113
See application file for complete search history.

(56) References Cited

U.S. PATENT DOCUMENTS

| | | | |
|---|---|---|---|
| 9,224,224 B2 | 12/2015 | Harder et al. | |
| 10,140,337 B2 | 11/2018 | Champlin et al. | |
| 10,303,690 B1 | 5/2019 | Todd et al. | |
| 10,394,946 B2 | 8/2019 | Miller et al. | |
| 10,452,444 B1 * | 10/2019 | Jibaja | G06F 9/4856 |
| 10,459,942 B1 * | 10/2019 | Silberstein | G06F 16/254 |
| 10,650,020 B1 * | 5/2020 | Mehta | G06F 16/258 |
| 10,685,279 B2 | 6/2020 | Oliner et al. | |
| 11,042,697 B2 | 6/2021 | Miller et al. | |
| 11,080,072 B1 | 8/2021 | Malament et al. | |
| 11,321,158 B2 | 5/2022 | Saxena et al. | |
| 11,442,952 B2 | 9/2022 | Hall et al. | |
| 11,487,708 B1 * | 11/2022 | Dangi | G06F 16/156 |
| 11,537,370 B2 | 12/2022 | Stojanovic et al. | |
| 11,593,322 B1 | 2/2023 | Simonelic, II et al. | |
| 11,621,899 B1 | 4/2023 | Bettaiah et al. | |
| 11,651,149 B1 | 5/2023 | Miller et al. | |

(Continued)

*Primary Examiner* — Robert W Beausoliel, Jr.
*Assistant Examiner* — Mohammad S Bhuyan
(74) *Attorney, Agent, or Firm* — Moore & Van Allen PLLC; Andrew T. Wood

(57) ABSTRACT

Systems, computer program products, and methods are described herein for transformative data analysis and data modeling in a distributed network. The present invention is configured to receive sample data from a source system into a data ingestion engine, transmit, from the data ingestion engine to a data governance engine a request for metadata of the sample data, construct metadata of the sample data, determine a data transformation of the sample data based on the schema, transform the sample data via the data transformation, and store transformed sample data and corresponding metadata in a shared data store. First and second views may also be generated, where the first view is a raw data view, and the second view is a processed view of the transformed data.

18 Claims, 8 Drawing Sheets

(56) References Cited

U.S. PATENT DOCUMENTS

| | | | |
|---|---|---|---|
| 2013/0046570 A1* | 2/2013 | Miller | G06Q 10/00 |
| | | | 705/7.11 |
| 2013/0080365 A1 | 3/2013 | Dewey et al. | |
| 2016/0092474 A1* | 3/2016 | Stojanovic | G06F 16/211 |
| | | | 707/805 |
| 2017/0090893 A1* | 3/2017 | Aditya | G06F 8/51 |
| 2018/0121526 A1* | 5/2018 | Wolfman | G06F 16/258 |
| 2020/0319857 A1 | 10/2020 | Lonial et al. | |

* cited by examiner

SYSTEM AND METHOD FOR TRANSFORMATIVE DATA ANALYSIS AND DATA MODELING IN A DISTRIBUTED NETWORK

FIELD OF THE INVENTION

The present invention embraces a system for transformative data analysis and data modeling in a distributed network.

BACKGROUND

In the current data science world, it is common for users or model developers to receive only sample data rather than entire populations, especially for structured or semi-structured data. This can create challenges in setting up a data pipeline due to the limited availability of data. This is a common issue across various platforms, including big data platforms, regular data warehousing, and how-to platforms, and creates a need to refine and optimize the data pipeline for more efficient processing using sample data. Accordingly, there is a need for a system and method for transformative data analysis and data modeling in a distributed network.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for transformative data analysis and data modeling in a distributed network is presented. The system may include a processing device, and a non-transitory storage device containing instructions when executed by the processing device causes the processing device to perform the steps of: receiving sample data from a source system into a data ingestion engine, wherein a source of the data is at least one selected from the group consisting of a file system, a cloud-based storage area, a data warehouse, and a data lake, and wherein the sample data is classified as a batch or stream, transmitting, from the data ingestion engine to a data governance engine, a request for metadata of the sample data, constructing metadata of the sample data using the data governance engine, wherein the metadata comprises a schema comprising at least one column, determining a data transformation of the sample data based on the schema, wherein the data transformation comprises at least one selected from the group consisting of statistical transformations, feature selection via principal component analysis, analysis of variance, and kurtosis measurement, transforming the sample data via the data transformation, and storing transformed sample data and corresponding metadata in a shared data store, wherein the shared data store is accessible by a plurality of users.

In some embodiments, executing the instructions further causes the processing device to perform the steps of: retrieving population data corresponding to the sample data based on a predetermined first relevant use case corresponding with the sample data, wherein the population data comprises the sample data and wherein the population data is retrieved via batch processing or real-time processing, transforming the population data into transformed population data via the data transformation, and storing the transformed population data in the shared data store.

In some embodiments, executing the instructions further causes the processing device to perform the steps of: generating a first view on a user interface, wherein the first view comprises a raw data view of the population data, and generating a second view on the user interface, wherein the second view comprises a processed view of the transformed population data.

In some embodiments, executing the instructions further causes the processing device to perform the steps of: receiving a request for access to the shared data store and the data governance engine from a first user, determining a role of the first user based on credentials of the first user, and automatically allowing selective access to the shared data store and the data governance engine based on the role of the first user, wherein the selective access comprises at least one selected from the group consisting of: read access, write access, and no access.

In some embodiments, the data governance engine further performs feature engineering of the sample data using the data governance engine.

In some embodiments, executing the instructions further causes the processing device to perform the steps of: determining, using the data governance engine, data characteristics comprising data quality, data governance, and data lineage for the sample data, and storing the data characteristics in the shared data store alongside corresponding transformed sample data and corresponding metadata.

In some embodiments, the request for metadata of the sample data comprises a request via a representational state transfer web API.

In another aspect, a computer program product for transformative data analysis and data modeling in a distributed network is presented. The computer program product may include a non-transitory computer-readable medium including code causing an apparatus to receive sample data from a source system into a data ingestion engine, wherein a source of the data is at least one selected from the group consisting of a file system, a cloud-based storage area, a data warehouse, and a data lake, and wherein the sample data is classified as a batch or stream, transmit, from the data ingestion engine to a data governance engine, a request for metadata of the sample data, construct metadata of the sample data using the data governance engine, wherein the metadata comprises a schema comprising at least one column, determining a data transformation of the sample data based on the schema, wherein the data transformation comprises at least one selected from the group consisting of statistical transformations, feature selection via principal component analysis, analysis of variance, and kurtosis measurement, transform the sample data via the data transformation, and store transformed sample data and corresponding metadata in a shared data store, wherein the shared data store is accessible by a plurality of users.

In yet another aspect, a method for transformative data analysis and data modeling in a distributed network is presented. The method may include receiving sample data from a source system into a data ingestion engine, wherein a source of the data is at least one selected from the group consisting of a file system, a cloud-based storage area, a data warehouse, and a data lake, and wherein the sample data is classified as a batch or stream, transmitting, from the data ingestion engine to a data governance engine, a request for metadata of the sample data, constructing metadata of the sample data using the data governance engine, wherein the metadata comprises a schema comprising at least one column, determining a data transformation of the sample data based on the schema, wherein the data transformation comprises at least one selected from the group consisting of statistical transformations, feature selection via principal component analysis, analysis of variance, and kurtosis measurement, transforming the sample data via the data transformation, and storing transformed sample data and corresponding metadata in a shared data store, wherein the shared data store is accessible by a plurality of users.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
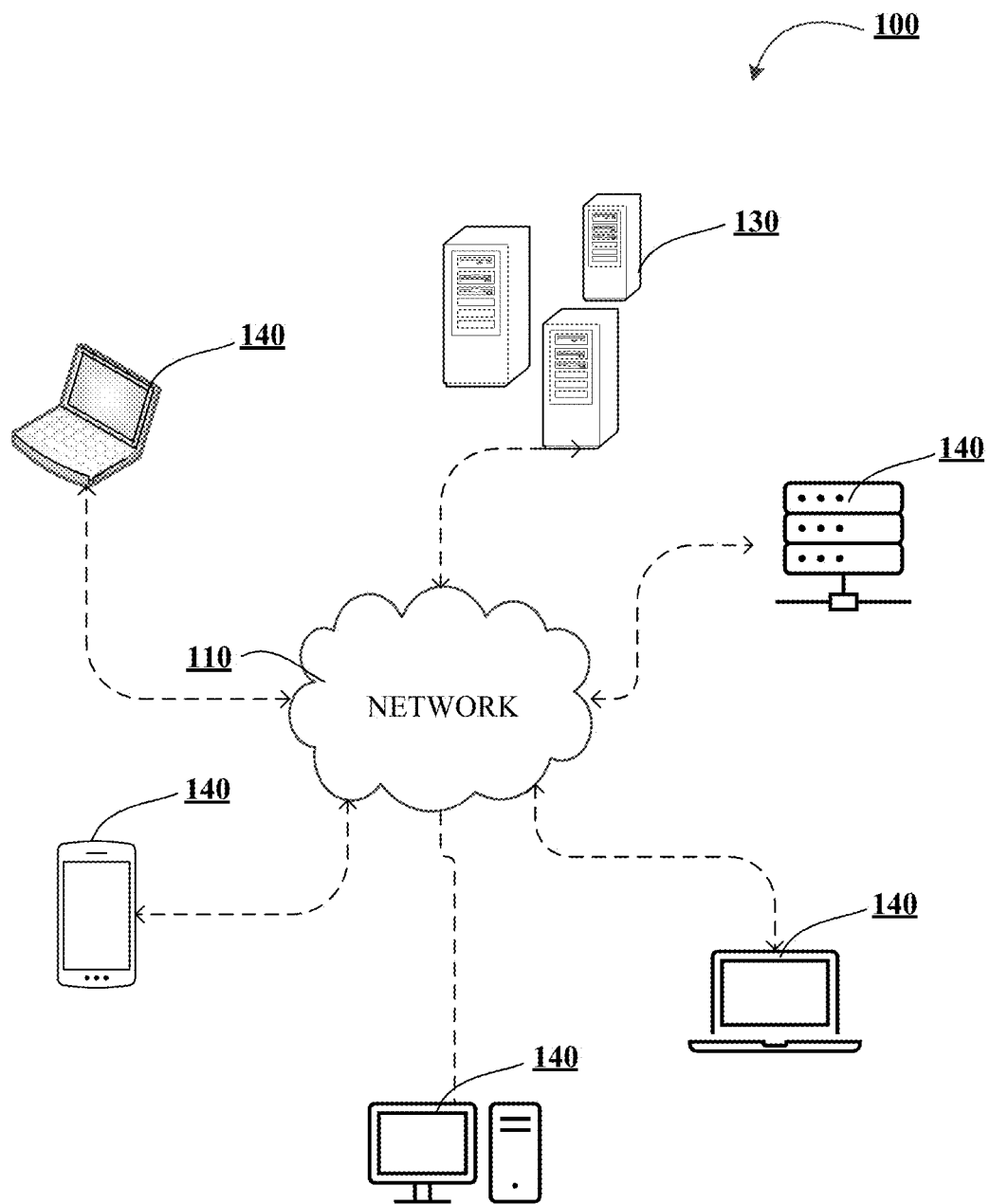
Figure 1B:
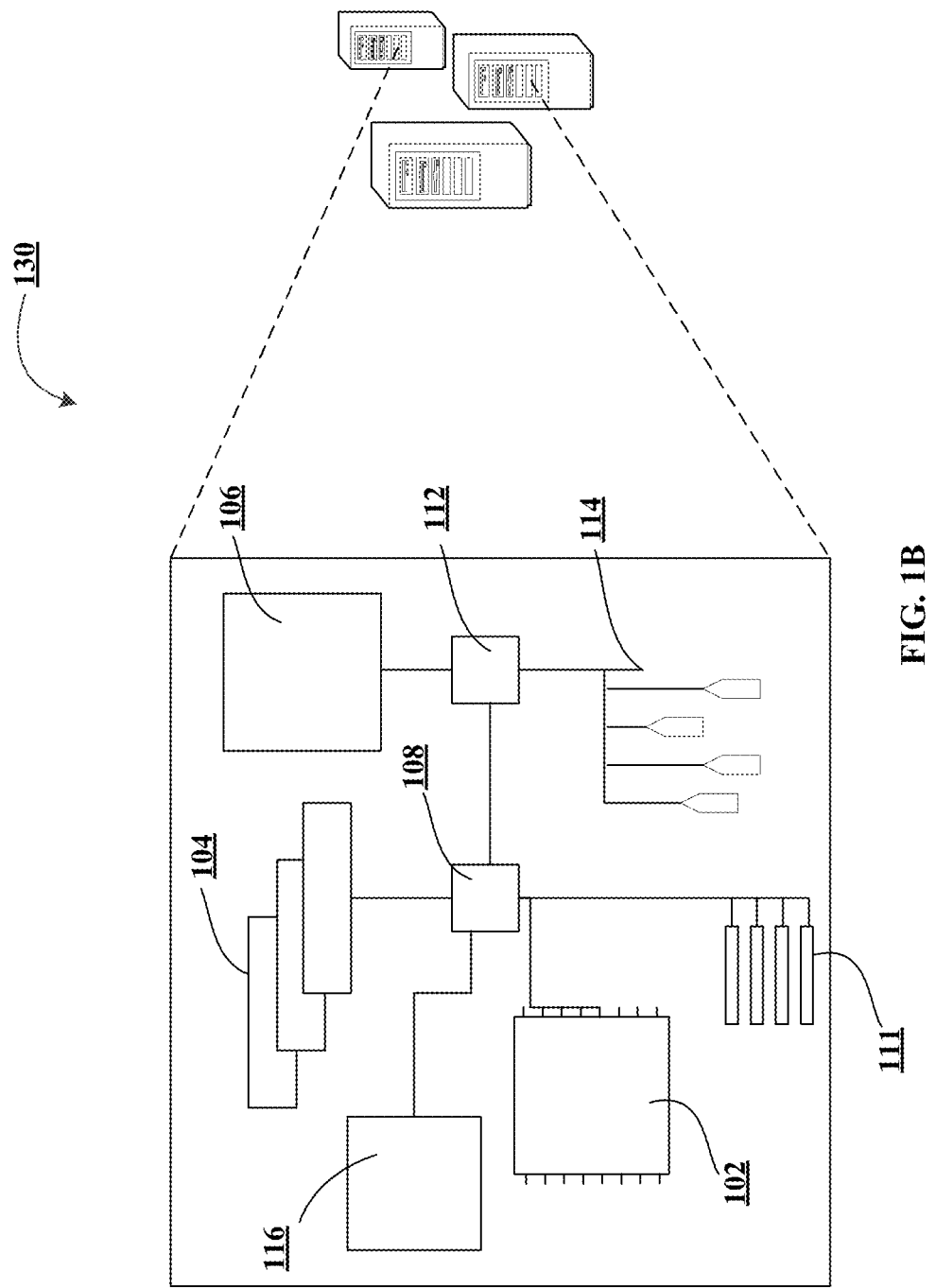
Figure 1C:
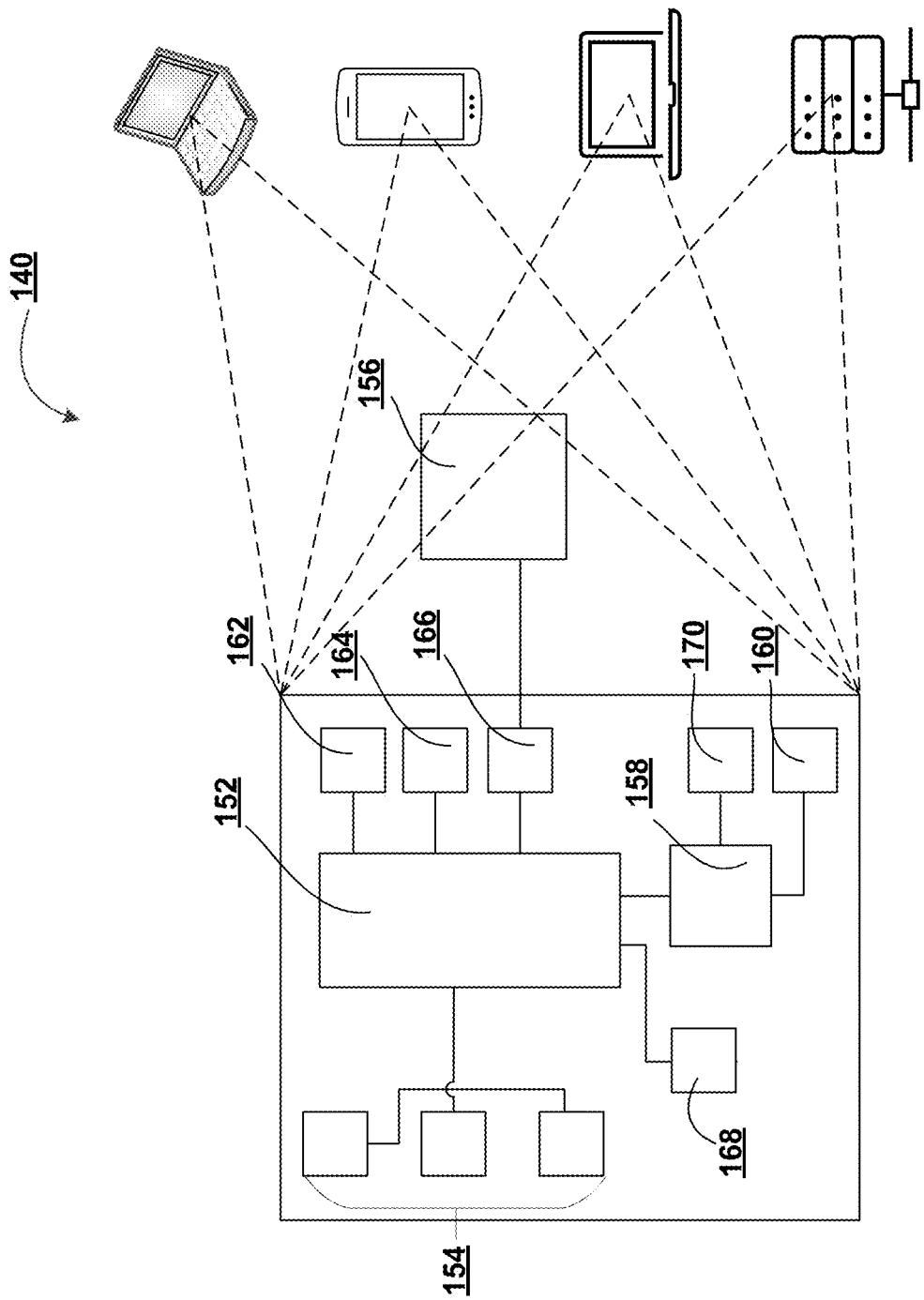
Figure 2:
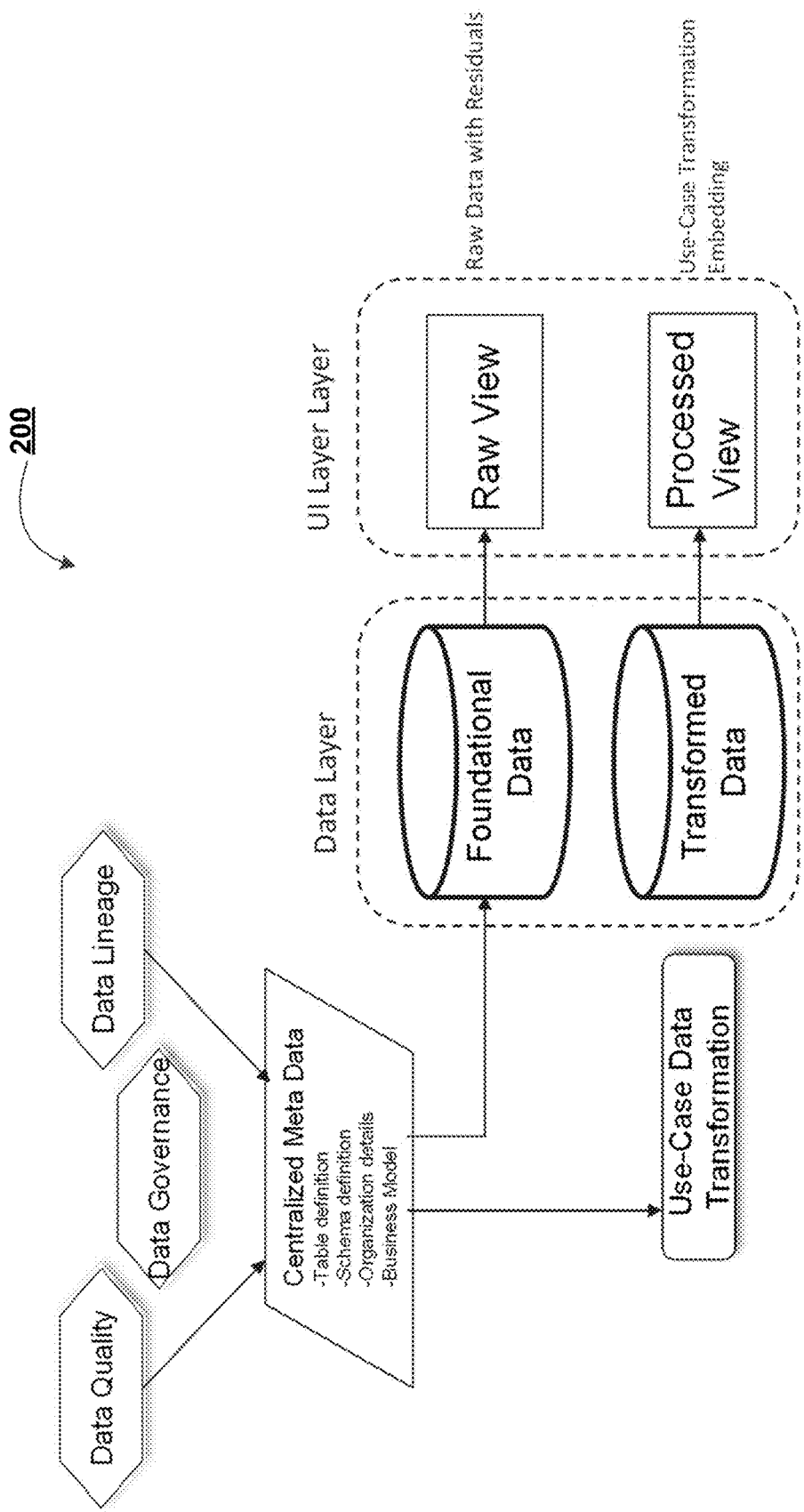
Figure 3:
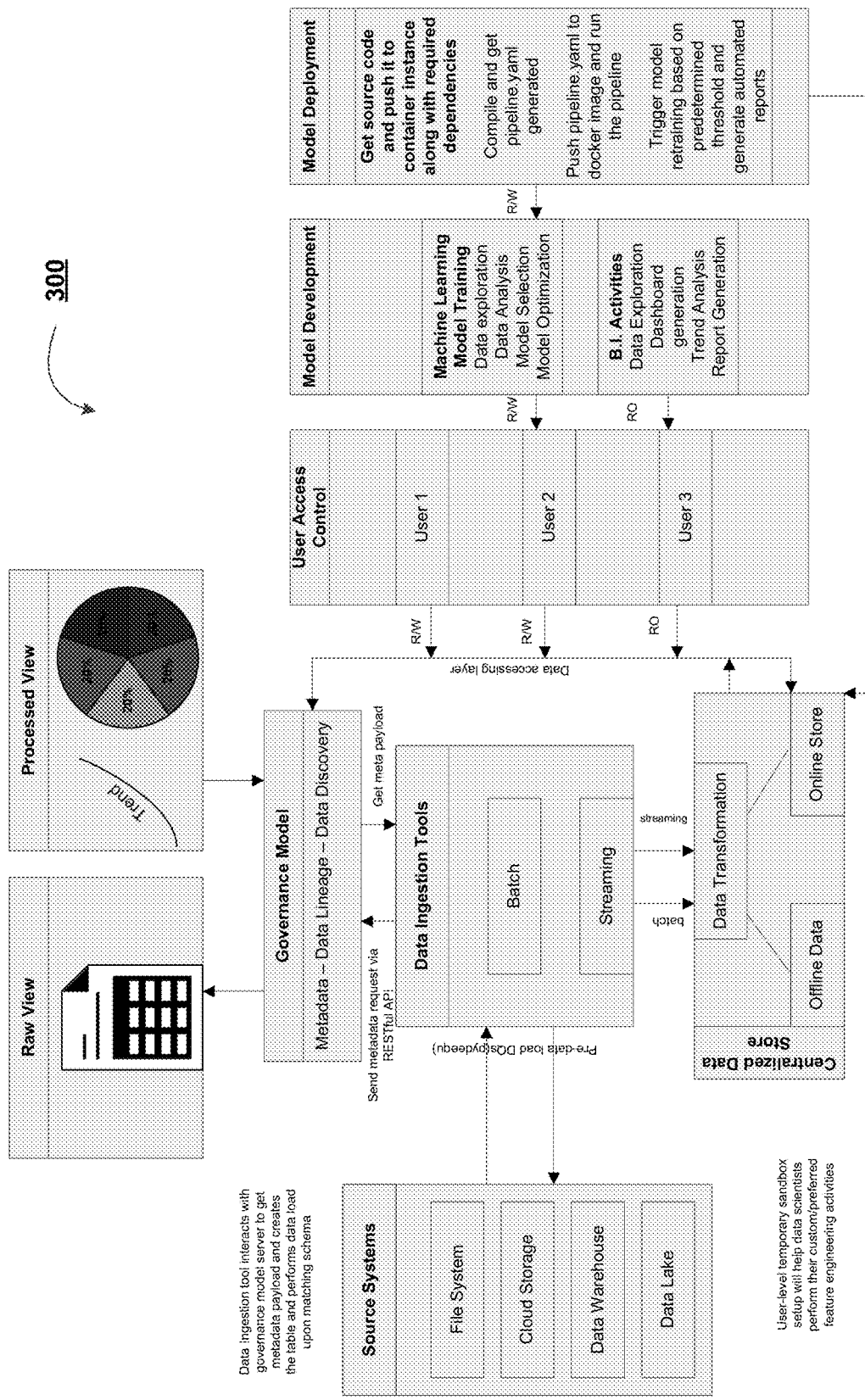
Figure 4:
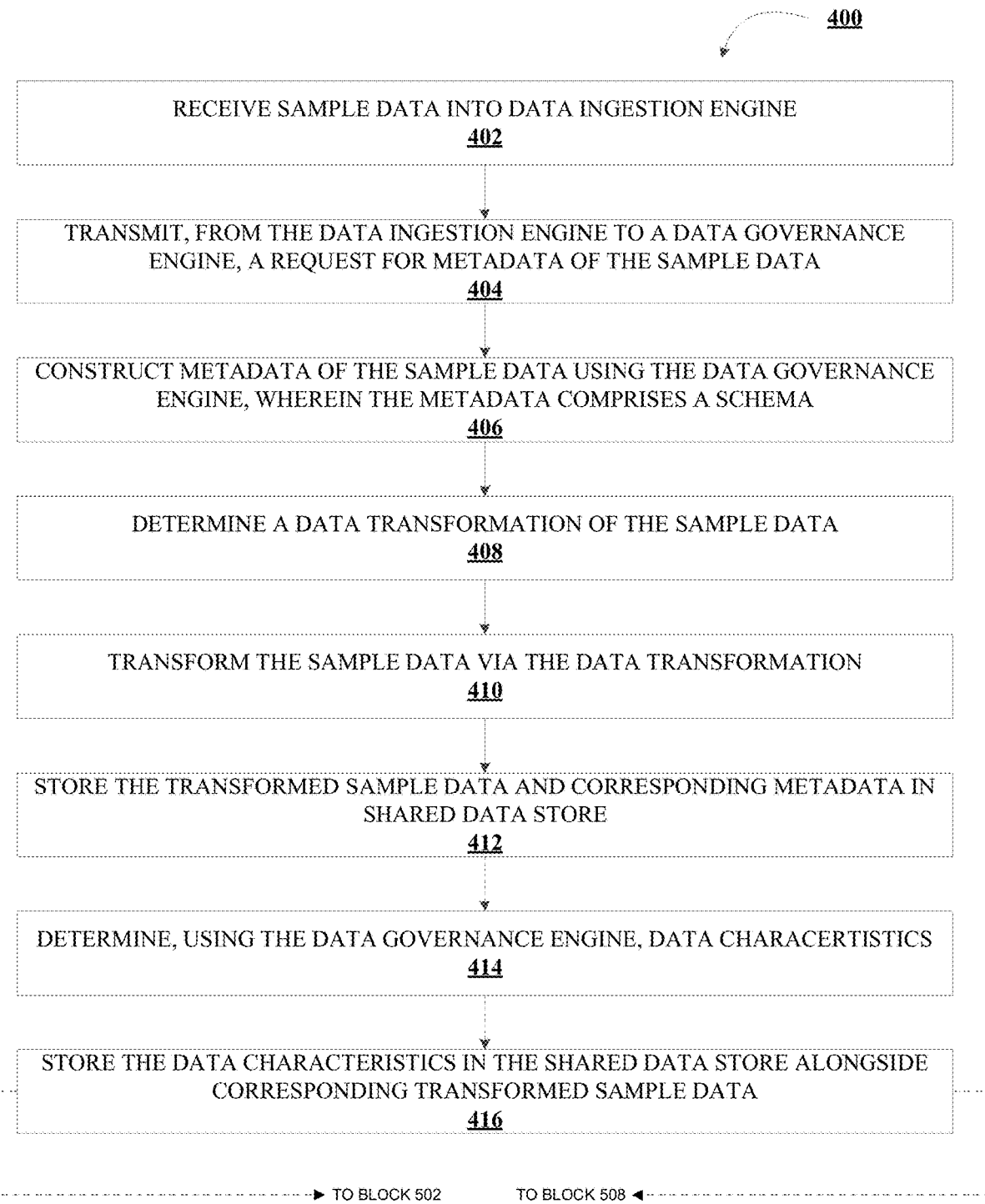
Figure 5:
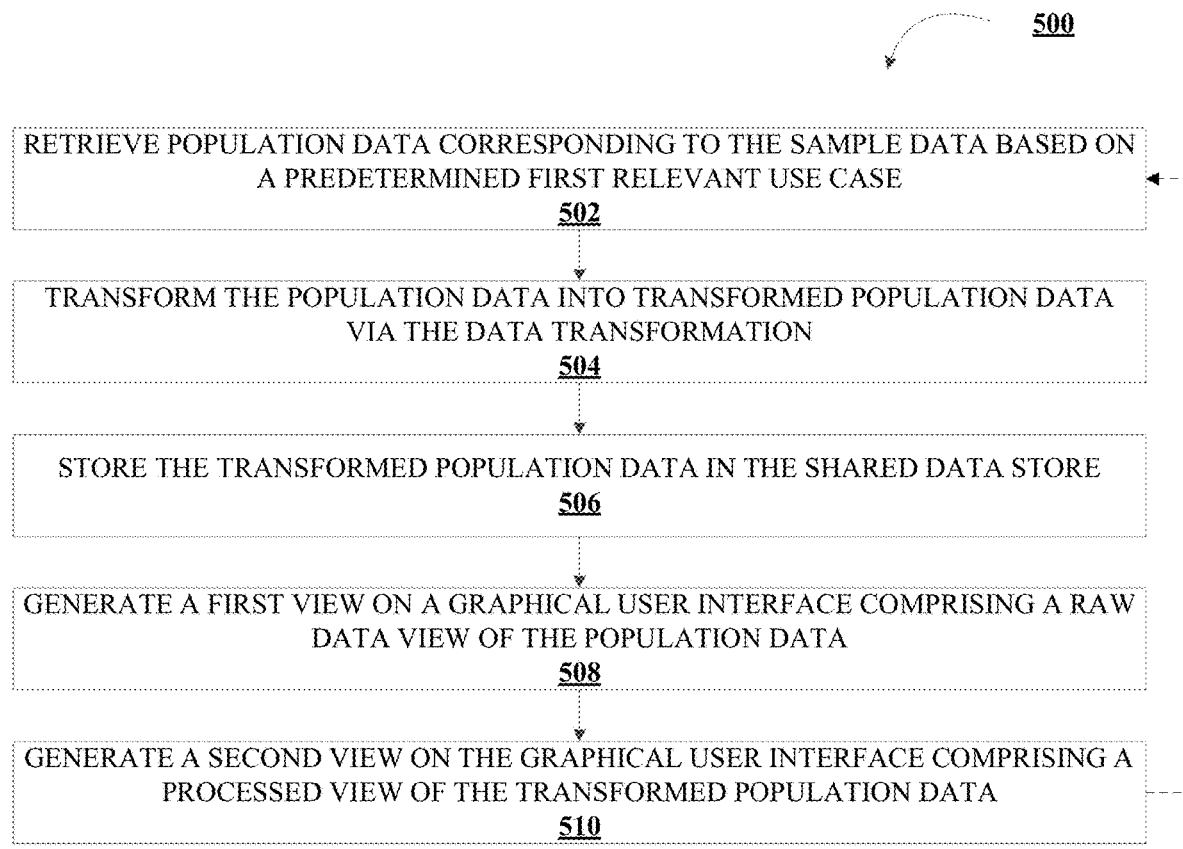
Figure 6:
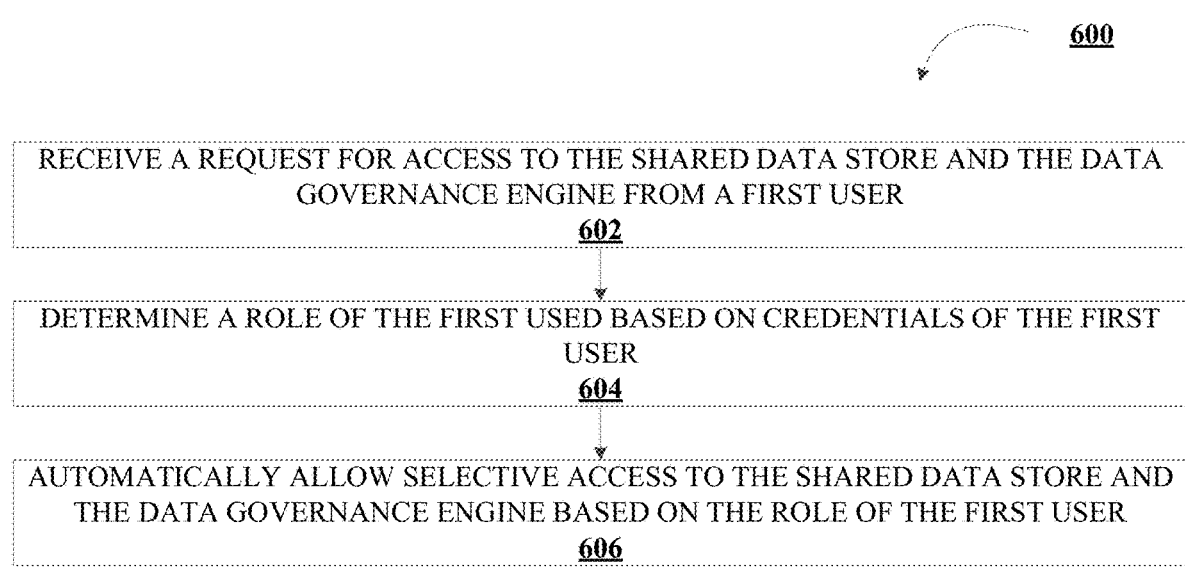

Having thus described embodiments of the invention in general terms, reference will now be made the accompanying drawings, wherein:

FIGS. 1A-1C illustrate technical components of an exemplary distributed computing environment for transformative data analysis and data modeling in a distributed network, in accordance with an embodiment of the invention;

FIG. 2 illustrates a flow diagram for transformative data analysis and data modeling in a distributed network, in accordance with an embodiment of the invention;

FIG. 3 illustrates a flow diagram for transformative data analysis and data modeling in a distributed network, in accordance with an embodiment of the invention;

FIG. 4 illustrates a process flow for transformative data analysis and data modeling in a distributed network, in accordance with an embodiment of the invention;

FIG. 5 illustrates a process flow for transformative data analysis and data modeling in a distributed network, in accordance with an embodiment of the invention; and FIG. 6 illustrates a process flow for transformative data analysis and data modeling in a distributed network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The technology described herein implements and approach to handle end-to-end data loading based on available sample data. Statistical methods are used to identify nuances and variations in the sample data, which helps to gain a deeper understanding of the data and identify any potential issues or inconsistencies. Schema identification techniques are implemented to find out the native data type of each attribute, select significant features, and maintain metadata in a centralized system for data governance. This helps to ensure that the data is properly structured and optimized for efficient processing. Tables or tensors are systematically created, and thereafter load the data for the population. The sample data is transformed, taking into account any variations or nuances identified through statistical methods. Two user interface views—the 'raw data view' and the 'processed view.' The raw data view will contain the data as received from the source system, while the processed view will contain the cleansed and statistically transformed versions of the actual data. By following this systematic approach, users can quickly understand the data and proceed with rapid model prototyping without spending much time on exploratory data analysis (EDA). Additionally, the use of statistical methods and metadata management ensures that the data is properly structured, optimized, and ready for efficient processing. This approach can save time and resources while ensuring accurate and reliable results, and also allow for users to understand different use cases beyond what has currently been defined.

Prior to the invention described herein, data analysis involved a group of users trying to come up with a use case upfront, even before receiving the sample data. However, this approach is inefficient and may not lead to the most accurate or relevant results. Regarding inefficiency, these traditional methods can result in wasted time and resources if the use case is not relevant or accurate. Regarding accuracy and relevancy of the results, the traditional method can lead to incorrect or irrelevant results if the use case is based on assumptions that are not supported by the sample data.

The invention disclosed herein provides a more effective approach involving the generating of a detailed statistical analysis of the sample data and performing of hypothesis testing. By analyzing the sample data, the user can gain a deeper understanding of the nuances and variations in the data and identify potential issues or inconsistencies. This approach is more efficient than the traditional approach because it allows the user to tailor the use case based on the sample data rather than trying to fit the sample data to a preconceived use case. This approach also helps to ensure that the data analysis is more accurate and relevant, as it takes into account the actual characteristics of the sample data.

Accordingly, the present disclosure provides for the data analysis and modeling using the sample data. Sample data is received from a source system into a data ingestion engine. The data ingestion engine transmits a request for metadata of the sample data to a data governance engine. Metadata of the sample data is constructed using the data governance engine, wherein the metadata comprises a schema comprising at least one column. A data transformation of the sample data is determined based on the schema. The sample data is transformed and stored along with corresponding metadata in a shared data store.

What is more, the present invention provides a technical solution to a technical problem. As described herein, the technical problem includes a use case being ill-suited to actual characteristics of data, leading to inaccurate or biased results in analysis and modeling. Moreover, the technical problem includes the inability to take into account the full range of nuances and variations in sample data. Without a detailed statistical analysis of the sample data, the user may miss important trends or patterns that could affect the data analysis. This can result in inaccurate or incomplete conclusions about the data, which leads to inefficiency and unnecessary time consumption. The technical solution presented herein allows for the analyzing the sample data and presentation and storage of transformed data for further analysis. In particular, the system is an improvement over existing data analysis systems by allowing for the data analysis (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for transformative data analysis and data modeling in a distributed network, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130, and endpoint device(s) 140, and techniques described here can be realized in digital electronic circuitry, integrated circuitry, specially designed ASICs (application specific integrated circuits), computer hardware, firmware, software, and/or combinations thereof.

FIGS. 2 and 3 illustrate flow diagrams for transformative data analysis and data modeling in a distributed network, in accordance with embodiments of the invention.

FIG. 4 illustrates a process flow 400 for transformative data analysis and data modeling in a distributed network, in accordance with an embodiment of the invention. The process may begin at block 402 where the system 130 receives sample data. The sample data is received from a source system 130 into a data ingestion engine. The system 130 may communicate with, and receive from, various types of sources of data, including, but not limited to file systems, cloud-based storage areas, data warehouses, data lakes, and so forth, or any combination thereof.

The sample data may be provided to/accessed by to the data ingestion engine of the system 130 in various modes, including "batch", where sample data previously stored (e.g., historical data) in the file systems, cloud-based storage areas, data warehouses, data lakes, and so forth are retrieved by the system 130 at a predetermined time. Alternatively, the sample data may be provided as "streaming" sample data, such that the sample data is captured in real-time as it is received by a node of the distributed network. Depending on whether the sample data is batch data or streaming data, the system 130 may utilize a distributed data processing platform for batch data or a real-time data processing platform for streaming data.

The process may continue at block 404, where the system 130 transmits a request for metadata of the sample data. The request for metadata is sent from the data ingestion engine to a data governance engine. As will be understood by one of ordinary skill in the art, the data governance engine may be provided as a readily available tool (e.g., an "off-the-shelf" software package) implemented by the entity, or in some embodiments the data governance engine may be programmed for specific use within the system 130 described herein. In either case, the data governance engine is a centralized platform for data governance that enables organizations to manage their data resources more effectively. The data governance engine includes several key features such as a data catalog, data lineage, and policy management, which help entities understand and manage their data. Users can also create workflows, automate processes, and collaborate with others to ensure that data is governed consistently and accurately across the entity. The data governance engine integrates with other tools and systems to provide a comprehensive view of an organization's data landscape.

Accordingly, the data governance engine automatically crawls and scans the data sources to identify and capture technical metadata, such as schema information, whether an attribute should be considered qualitative, or quantitative (if an attribute refers to a commonly used numbering column), data types, and relationships between tables. It may also allow users to manually enter and update business metadata, such as data definitions, business terms, and data classifications.

The data governance engine may also provide a data catalog that aggregates and organizes the metadata in a searchable format. Users can browse the catalog to discover data resources, understand their structure, and view related metadata. The data governance engine also provides data lineage, which traces the flow of data from its source to its destination, including any transformations or modifications that occur along the way. This helps users understand the impact of changes and ensures that data is governed consistently.

In some embodiments, the request for metadata of the sample data comprises a request via a representational state transfer web API (e.g., a "RESTful API" or "REST API"), which is an interface that two computer systems may use to exchange information securely. Thus, the data ingestion engine may send to the data governance engine, via RESTful API, a command to determine the metadata of the sample data.

Continuing at block 406, as a result of receiving the request for metadata of the sample data, the system 130 may construct metadata of the sample data using the data governance engine. The construction of metadata may occur as a metadata "harvesting" process that uses an "application ID" and a client key of a directory application to access various APIs, each of which retrieves basic "Power BI" metadata and in some embodiments stores it in a metadata repository. The metadata may also comprise schema, and each schema may define at least one column of a table of the metadata schema. A schema is plan that describes the structure and organization of a database or dataset. It defines the tables, fields, relationships, constraints, and other elements. A schema is a formal description of the structure of the sample data, and it provides a framework for organizing and manipulating sample data.

The process may then continue at block 408 where a data transformation of the sample data is determined based on the schema. The schema of data can provide valuable information about the structure and relationships of the data, which can be used to make decisions about the type of data processing that is needed. Factors defined by the schema may be considered when deciding on the appropriate processing techniques.

For example, the data type can help determine the appropriate processing techniques that should be used. If the data is structured in a hierarchical format, such as a tree or nested tables, then hierarchical methods such as hierarchical clustering or decision trees may be appropriate for analysis. If the data is relational, with tables and relationships between them, then relational methods or join operations may be appropriate. If the data is temporal, with time series data, then time series analysis methods may be appropriate.

By considering all of these factors, it is possible to choose the most appropriate processing techniques for a given dataset. In some embodiments, the data transformation may be predetermined by a user, based on the schema. Examples of data transformations include interpolation to handle missing values, duplicate removal, significant feature selection using hypothesis/PCA, feature augmentations, statistical metrics such as ANOVA, MANOVA, Correlation Co-efficiency, data distribution type, Kurtosis measurement, Skewness, analysis of variance, auto-encoding, and so forth.

The process may continue at block 410 where the system 130 transforms the sample data via the data transformation. As the data transformation to be implemented has been determined at prior steps, the step illustrated at block 410 transforms the sample data with such data transformation, such as through interpolation to handle missing values, duplicate removal, significant feature selection using hypothesis/PCA, feature augmentations, statistical metrics such as ANOVA, MANOVA, Correlation Co-efficiency, data distribution type, Kurtosis, Skewness, auto-encoding, and so forth.

As one non-limiting example, in some embodiments, the system 130 may receive a request to perform a hypothesis test via principal component analysis. First, the system 130, based on the schema, may define the null hypothesis and alternative hypothesis. The null hypothesis is typically the statement that there is no significant relationship between the variables, while the alternative hypothesis is the opposite. A PCA analysis may then be performed. The goal of PCA is to reduce the dimensionality of the data while retaining most of the variation. This involves calculating the principal components and identifying the ones that explain the most variation in the data.

The eigenvalues may then be calculated, which represent the amount of variation explained by each principal component. The system 130 calculates the proportion of total variation explained by each component. Next, the system 130 would perform a hypothesis test. The system 130 would use a statistical test such as the chi-squared test or the F-test to determine whether the proportion of variation explained by each component is significantly different from what would be expected under the null hypothesis. If the p-value is less than the significance level (e.g. 0.05), the system 130 would reject the null hypothesis and conclude that there is a significant relationship between the variables. If the p-value is greater than the significance level, the system 130 would fail to reject the null hypothesis. Of course, various data transformations other than hypothesis tests may be applied to the sample data, as would be understood by one of ordinary skill in data analytics and statistics.

As illustrated in block 412, the system 130 may then store transformed sample data and corresponding metadata in a shared data store, wherein the shared data store is accessible by a plurality of users. In some embodiments, the shared data store is a traditional storage device. In other embodiments, the shared data store may comprise a "delta lake", which is an optimized storage layer for storing data and tables that runs on top of an existing data lake to improve reliability, security, and performance. The delta lake allows for the accessibility and analysis of data in real time by adding a layer of intelligent data management and governance for both streaming and batch operations of data from a source. Further, the delta lake protects consistency of data and prevention of corruption of data by enforcing schema.

In some embodiments, and as illustrated by block 414, the system 130, using the data governance engine, may determine data characteristics of the sample data. These data characteristics may comprise data quality, data governance, or data lineage for the sample data. For example, it is well established that certain data governance engines calculate the quality of data based on predefined aggregation paths and metrics. The data governance engine may also determine and record data lineage to allow for the tracking and analysis of data flow, e.g., chain-of-custody of various data, and how it flows over time.

In some embodiments, the quality and/or relevance of data in the sample data may be such where data transformation output may be improved. Accordingly, the data governance engine may be structured to further performs feature engineering of the sample data. The data governance engine may use information about the domain, the applied data transformation, or the like to extract relevant features from the sample data. In this way, the sample data may be cleansed or have the number of features reduced via feature selection to streamline and improve the data transformation process. The general process applied by the data governance engine is to (i) test features, (ii) decide which features to create, (iii) create features, (iv) test the impact of the identified features on the task (here, the data transformation), and (v) improving and repeating if necessary.

Next, and as illustrated in block 416, the system 130 may store the data characteristics of the sample data in the shared data store alongside corresponding transformed sample data and corresponding metadata. In this way, and as will be described in detail with respect to FIG. 6, various users with different roles may access the sample data in the shared data store, alongside all of the relevant characteristics and metadata, such that said various users can each utilize the data in their own way for various use-cases.

FIG. 5 illustrates a process flow 500 for transformative data analysis and data modeling in a distributed network, in accordance with an embodiment of the invention. The process may begin at block 502, where the system 130 retrieves population data corresponding to the sample data. It shall be understood that while sample data is valuable for initial analysis, transformation, and making quick assumptions, it may be beneficial to a user to evaluate and entire groups of data represented by the sample data, such as to yield more accurate analyses, data transformations, assumptions, and so forth. The population data comprises the sample data.

It is important to note that in some embodiments, population data is not retrieved, nor is it requested to be retrieved. In other words, in some instances, the sample data that has been transformed into transformed sample data may contain enough information for the user to glean the statistical information desired. Accordingly, instead of performing each of the steps outlined in FIG. 5, the system 130 may instead proceed to blocks 508 and 510, as will be described fully herein. In this way, raw sample data and processed sample data views may be presented to the user.

The system 130 queries a storage device containing the population data, where the population data corresponding to the sample data is determined by the metadata or data lineage of the sample data stored by the data governance engine. Once identified and queried, the system 130 may be configured to receive the population data via batch processing or real-time processing in a similar manner as was implemented for the sample data.

The retrieval of population data may be based on a use-case of the sample data defined by a user, where the use-case may benefit from the additional, more complete, data. As such, the use-case is a predefined qualitative characteristic that may correspond to various portions of population data, or in some embodiments correspond to sample data as a subset of the population data. Determining whether to use population data or sample data depends on the analysis being asked of the system 130. If a user has a predetermined use case, the user should consider several steps to decide whether to retrieve population data or only sample data. The user may consider the scope of the analysis. If the analysis pertains to a small, defined population, it may be possible to collect data from the entire population. For example, if the analysis pertains to the opinions of residents in a particular neighborhood, it may be feasible to survey all residents in that neighborhood. The user should assess the feasibility of collecting data from the entire population. This includes considerations such as the availability of resources, the time frame for the analysis, and the size of the population. If it is not feasible to collect data from the entire population, the user may need to rely on sample data. The user may also determine the appropriate sample size for the analysis. This involves considering factors such as the level of precision desired, the variability in the population, and the level of confidence desired. If the sample size is determined to be adequate to analyze the data with reasonable precision, then the user can proceed with collecting and analyzing only sample data.

In some embodiments, the system 130 may present predetermined use-cases to the user via the user interface prior to the retrieval of the population data, and receive a selection of a use-case from the user via the user interface. The system 130 may have a database that correlates each of these use-cases with an indicator of whether the population data should be collected, or not. For example, the system 130 may present to the user a use-case of wholesale credit rankings. Upon selection of this use-case, the system 130 may acknowledge the selection and proceed with retrieval of the population data, since it has been predefined in the system 130 that wholesale credit rankings require extensive population data.

Next, as illustrated in block 504, the system 130 may transform the population data into transformed population data via the data transformation. In some embodiments, the data transformation is the same data transformation applied to the sample data illustrated in FIG. 4. For example, if an ANOVA is implemented for the sample data, then ANOVA is implemented for the population data. In other embodiments, the data transformation applied to population data comprises the same data transformation applied to the sample data, but also includes other data transformations. For example, if an ANOVA is implemented for the sample data, then ANOVA and Kurtosis may be both implemented for the population data.

The process may continue at block 506 where the system 130 stores the transformed population data in the shared data store. In some embodiments, the shared data store is the same shared data store as that which contains the sample data, metadata, etc. as discussed in FIG. 4. In other embodiments, the shared data store may be a second shared data store, unique from the first shared data store discussed with respect to FIG. 4.

Continuing at block 508, the system 130 may generate a first view on a user interface. The first view presents to the user a raw data view of the population data, or in some embodiments, sample data, where the raw data is presented in a raw format (e.g., clean or non-manipulated data) such as (i) a text format such as in a simple text editor or terminal window suitable for viewing textual data such as logs, reports, and spreadsheets, or (ii) tabular format displaying raw data in a table or spreadsheet format, allowing for easy comparison and analysis of data.

Continuing to block 510, the system 130 also generates a second view on the user interface, wherein the second view comprises a processed view of the transformed population data, or in some embodiments, transformed sample data. The processed view could refer to any other graphical means of presenting the transformed population data and/or the transformed sample data. Examples include visual representations such as charts, graphs, or diagrams for assistance in viewing data with patterns or trends, or for summarizing complex data sets. The transformed population data may also be presented in the processed view in geographic format which displays raw data on a map, allowing for spatial analysis and visualization if the data contains location-based information.

The first and second views may be presented to the user simultaneously, such that the first and second views are arranged adjacent one another or otherwise arranged to be visible on the same user interface. This novel approach to presenting the first and second views on the same user interface allows for users to view the raw data and processed data (e.g., transformed data) simultaneously. The benefit of the two-view arrangement is that it allows users to observe and analyze data from different perspectives, which can lead to a more comprehensive understanding of the data. The raw view provides a straightforward, unprocessed view of the data, while the processed view contains techniques and tools that can help users analyze the data, such as statistical tests or hypothesis testing. Having these two views side-by-side allows users to compare and contrast different aspects of the data, such as the raw data distribution versus the moving average or exponential smooth value. By doing so, users can identify patterns or trends that may not be apparent from a single view alone.

In some embodiments, if the first and second views depict sample data and transformed sample data, the system 130 may display on the user interface of an endpoint device 140 a selection icon to revert the system 130 back to block 502 to retrieve the population data. For example, a user may view the second view of the sample data and determine that the analysis may benefit from additional data, thus the system 130 should retrieve population data corresponding to the sample data, as described with respect to block 502. Accordingly, an icon containing text such as "retrieve population data" may be presented to the user for selection by the user.

FIG. 6 illustrates a process flow 600 for transformative data analysis and data modeling in a distributed network, in accordance with an embodiment of the invention. It shall be appreciated that the transformations of data described, either the sample data, population data, or both, may be beneficial to various users across a distributed network. However, such users across the distributed network may wish to analyze the data in different ways specific to areas of business that may have different use-cases for the data. For example, a user in a data science group may want to define their own data set(s) with ten (10) columns, while a marketing analyst may want to define their own data set(s) based on the same data with four (4) columns.

Users of various roles, operational groups, entities, or other subcategorization of users may be assigned to different levels of access (e.g., "permissions") to the system 130, and specifically the shared data store. These types of access could be "read only" access ("ro" or "r/o"), "read-write" access ("rw" or "r/w"), or no access. Accordingly, users are provided at various levels of permissions depending on their role.

The process may begin at block 602 where the system 130 receives a request for access to the shared data store and the data governance engine from a user. The request is generally provided by a user through a user interface of an endpoint device 140. As illustrated in block 604, once the system 130 receives such a request, the system 130 the determines a role of the user based on credentials of the user. The credentials of the user are generally provided by the user to access the system 130, through log-in methods such as the entering of a username and password. Based on the username and the system 130 querying a corresponding database with the username or other credential, the role of the user is ascertained. The ascertained role may then be cross-referenced to a database containing predetermined permissions levels for various roles.

As illustrated in block 604, in some embodiments the system 130 automatically allows selective access to the shared data store and the data governance engine based on the role of the user, wherein the selective access comprises at least one selected from the group consisting of: read access, write access, and no access.

As will be appreciated by one of ordinary skill in the art in view of this disclosure, the present invention may include and/or be embodied as an apparatus (including, for example, a system 130, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for transformative data analysis and data modeling in a distributed network, the system comprising:
   a processing device; and
   a non-transitory storage device containing instructions when executed by the processing device causes the processing device to perform the steps of:
   receiving sample data from a source system into a data ingestion engine, wherein a source of the data is at least one selected from the group consisting of a file system, a cloud-based storage area, a data warehouse, and a data lake, and wherein the sample data is classified as a batch or stream;
   transmitting, from the data ingestion engine to a data governance engine, a request for metadata of the sample data, wherein the data governance engine comprises data lineage tracing;
   constructing metadata of the sample data using the data governance engine, wherein the metadata comprises a schema comprising at least one column;
   determining a data transformation of the sample data based on the schema, wherein the data transformation comprises feature selection via principal component analysis;
   transforming the sample data via the data transformation;
   storing transformed sample data and corresponding metadata in a shared data store, wherein the shared data store is a delta lake accessible by a plurality of users;
   retrieving population data corresponding to the sample data, wherein the population data comprises the sample data and wherein the population data is retrieved via batch processing or real-time processing;
   transforming the population data into transformed population data via the data transformation;
   storing the transformed population data in the shared data store;
   generating a first view on a user interface, wherein the first view comprises a raw data view of the population data; and
   generating a second view on the user interface, wherein the second view comprises a processed view of the transformed population data;
   wherein the first view and the second view are displayed adjacent one another.

2. The system of claim 1, wherein executing the instructions further causes the processing device to perform the steps of:
   receiving a request for access to the shared data store and the data governance engine from a first user;
   determining a role of the first user based on credentials of the first user; and
   automatically allowing selective access to the shared data store and the data governance engine based on the role of the first user, wherein the selective access comprises at least one selected from the group consisting of: read access, write access, and no access.

3. The system of claim 1, wherein the data governance engine further performs feature engineering of the sample data using the data governance engine.

4. The system of claim 1, wherein executing the instructions further causes the processing device to perform the steps of:
   determining, using the data governance engine, data characteristics comprising data quality, data governance, and data lineage for the sample data; and
   storing the data characteristics in the shared data store alongside corresponding transformed sample data and corresponding metadata.

5. The system of claim 1, wherein the request for metadata of the sample data comprises a request via a representational state transfer web API.

6. The system of claim 1, wherein executing the instructions further causes the processing device to perform the steps of:
   displaying a plurality of predetermined use-cases; and
   receiving a selection of a selected use-case of the plurality of predetermined use-cases;
   wherein retrieving the population data corresponding to the sample data is based on the selected use-case.

7. A computer program product for transformative data analysis and data modeling in a distributed network, the computer program product comprising a non-transitory computer-readable medium comprising code causing an apparatus to:
   receive sample data from a source system into a data ingestion engine, wherein a source of the data is at least one selected from the group consisting of a file system, a cloud-based storage area, a data warehouse, and a data lake, and wherein the sample data is classified as a batch or stream;
   transmit, from the data ingestion engine to a data governance engine, a request for metadata of the sample data, wherein the data governance engine comprises data lineage tracing;
   construct metadata of the sample data using the data governance engine, wherein the metadata comprises a schema comprising at least one column;
   determine a data transformation of the sample data based on the schema, wherein the data transformation comprises feature selection via principal component analysis;
   transform the sample data via the data transformation;

store transformed sample data and corresponding metadata in a shared data store, wherein the shared data store is a delta lake accessible by a plurality of users;

retrieve population data corresponding to the sample data, wherein the population data comprises the sample data and wherein the population data is retrieved via batch processing or real-time processing;

transform the population data into transformed population data via the data transformation;

store the transformed population data in the shared data store;

generate a first view on a user interface, wherein the first view comprises a raw data view of the population data; and generate a second view on the user interface, wherein the second view comprises a processed view of the transformed population data;

wherein the first view and the second view are displayed adjacent one another.

8. The computer program product of claim 7, wherein the code further causes the apparatus to:

receive a request for access to the shared data store and the data governance engine from a first user;

determine a role of the first user based on credentials of the first user; and automatically allow selective access to the shared data store and the data governance engine based on the role of the first user, wherein the selective access comprises at least one selected from the group consisting of: read access, write access, and no access.

9. The computer program product of claim 7, wherein the data governance engine further performs feature engineering of the sample data using the data governance engine.

10. The computer program product of claim 7, wherein the code further causes the apparatus to:

determine, using the data governance engine, data characteristics comprising data quality, data governance, and data lineage for the sample data; and store the data characteristics in the shared data store alongside corresponding transformed sample data and corresponding metadata.

11. The computer program product of claim 7, wherein the request for metadata of the sample data comprises a request via a representational state transfer web API.

12. The computer program product of claim 7, wherein the code further causes the apparatus to:

display a plurality of predetermined use-cases; and receive a selection of a selected use-case of the plurality of predetermined use-cases;

wherein retrieving the population data corresponding to the sample data is based on the selected use-case.

13. A method for transformative data analysis and data modeling in a distributed network, the method comprising:

receiving sample data from a source system into a data ingestion engine, wherein a source of the data is at least one selected from the group consisting of a file system, a cloud-based storage area, a data warehouse, and a data lake, and wherein the sample data is classified as a batch or stream;

transmitting, from the data ingestion engine to a data governance engine, a request for metadata of the sample data, wherein the data governance engine comprises data lineage tracing;

constructing metadata of the sample data using the data governance engine, wherein the metadata comprises a schema comprising at least one column;

determining a data transformation of the sample data based on the schema, wherein the data transformation comprises feature selection via principal component analysis;

transforming the sample data via the data transformation;

storing transformed sample data and corresponding metadata in a shared data store, wherein the shared data store is a delta lake accessible by a plurality of users;

retrieving population data corresponding to the sample data, wherein the population data comprises the sample data and wherein the population data is retrieved via batch processing or real-time processing;

transforming the population data into transformed population data via the data transformation;

storing the transformed population data in the shared data store;

generating a first view on a user interface, wherein the first view comprises a raw data view of the population data; and generating a second view on the user interface, wherein the second view comprises a processed view of the transformed population data;

wherein the first view and the second view are displayed adjacent one another.

14. The method of claim 13, wherein the method further comprises:

receiving a request for access to the shared data store and the data governance engine from a first user;

determining a role of the first user based on credentials of the first user; and automatically allowing selective access to the shared data store and the data governance engine based on the role of the first user, wherein the selective access comprises at least one selected from the group consisting of: read access, write access, and no access.

15. The method of claim 13, wherein the data governance engine further performs feature engineering of the sample data using the data governance engine.

16. The method of claim 13, wherein the method further comprises:

determining, using the data governance engine, data characteristics comprising data quality, data governance, and data lineage for the sample data; and storing the data characteristics in the shared data store alongside corresponding transformed sample data and corresponding metadata.

17. The method of claim 13, wherein the request for metadata of the sample data comprises a request via a representational state transfer web API.

18. The method of claim 13, wherein the method further comprises:

displaying a plurality of predetermined use-cases; and receiving a selection of a selected use-case of the plurality of predetermined use-cases;

wherein retrieving the population data corresponding to the sample data is based on the selected use-case.

* * * * *